United States Patent [19]
Johnston

[11] 3,778,243
[45] Dec. 11, 1973

[54] METAL OXIDE COATED GLASS BLOCKS
[75] Inventor: William D. Johnston, Pittsburgh, Pa.
[73] Assignee: Pittsburgh Corning Corporation, Pittsburgh, Pa.
[22] Filed: Nov. 10, 1971
[21] Appl. No.: 197,472

[52] U.S. Cl..................... 65/58, 65/60, 117/107.2 R
[51] Int. Cl........................ C03b 23/24, C03c 17/00
[58] Field of Search................................. 65/60, 58; 117/107.2 R

[56] References Cited
UNITED STATES PATENTS

| 2,297,337 | 9/1942 | Wiley | 65/58 X |
| 3,563,717 | 2/1971 | Bertram | 65/60 X |
| 3,472,641 | 10/1969 | Gray | 65/60 |
| 3,516,811 | 6/1970 | Gatchet et al. | 65/60 |
| 2,877,605 | 3/1959 | Hoshowsky | 65/58 |
| 3,223,501 | 12/1965 | Fredley et al. | 65/60 X |
| 2,795,084 | 6/1957 | Littleton | 65/60 X |
| 2,430,520 | 11/1947 | Marboe | 117/107.2 R |
| 3,594,216 | 7/1971 | Charles et al. | 117/107.2 R |
| 3,004,875 | 10/1961 | Lytle | 65/60 UX |

Primary Examiner—S. Leon Bashore
Assistant Examiner—Kenneth M. Schor
Attorney—Stanley J. Price, Jr.

[57] ABSTRACT

The method of preparing transparent metal oxide coated glass blocks includes forming the blocks in halves by positioning a molten mass of glass in a suitable mold that has a fixed bottom plate and a vertical exterior forming shell. A plunger is inserted into the mold to shape the molten mass of glass into a half of a glass block with an upwardly extending rectangular edge portion. While at an elevated temperature of above 1,000° F. the rectangular edge portions of two block halves are positioned in overlying abutting relation and are flame sealed. While still at an elevated forming temperature of between about 900° F. and 1,150° F. the sealed block is sprayed with a heat decomposable metal organic salt in organic solution to form a metal oxide coating on the block exterior surface. After spraying at this elevated forming temperature the block is annealed in a conventional manner. Another embodiment includes spraying the inside surface of the block halves at this elevated temperature immediately after forming and prior to sealing. Still another embodiment includes spraying the outside surface of the block halves immediately after forming and prior to sealing while at the elevated temperature of between about 900° and 1,150° F.

9 Claims, No Drawings

METAL OXIDE COATED GLASS BLOCKS

BACKGROUND OF THE INVENTION

1. Field of the Invention

This invention relates to a method of forming metal oxide coated glass blocks and more particularly to a method of coating glass blocks while at elevated forming temperatures.

2. Description of the Prior Art

The method of forming metal oxide coating on glass surfaces by various techniques including spraying a solution of the oxide onto the glass surface and depositing a metal salt on the glass surface at an elevated temperature to form a metal oxide thereon is known. Metal oxide coated glass has a multitude of applications such as heat screens and other types of radiation screens useful in windows and the like. U. S. Pat. No. 2,567,331 discloses a process for heating a glass sheet to an elevated temperature and thereafter spraying a heat decomposable organic tin compound such as dibutyl tin diacetate in an organic solvent on the surface of the glass sheet to form a tin oxide film thereon.

U. S. Pat. No. 2,185,586 discloses a process for forming a cobalt oxide film on a glass sheet by heating the glass sheet to a temperature between 400° F. and its melting point and spraying a colloidal suspension of 2-ethyl hexanoate in an organic solvent onto the surface of the glass sheet.

In both of the above processes the organic metal compound thermally decomposes upon contact with the heated glass surface and forms a metal oxide that remains on the glass surface with simultaneous evaporation of the organic solvent carrier. In many cases, however, and especially with cobalt oxide coatings, mottled or patchy coatings are obtained. It is believed poor adhesion between the metal oxide and the glass substrate due to entrapment of unpyrolized organic carrier and organic metal residue causes the mottled or patchy coating. It is, therefore, essential with the above processes to properly prepare the glass surface substrate prior to coating with the tin salts.

U. S. Pat. No. 3,411,934 discloses a method of forming a mixed metal oxide coating on a glass substrate wherein a tin oxide base is first applied to the substrate and thereafter a cobalt oxide coating is sprayed onto the tin oxide base. The glass substrate is first thoroughly cleaned and rinsed at room temperature and thereafter the glass substrate is heated to an elevated temperature. A tin oxide yielding compound in an organic solution, for example, a normal propanol solution of dibutyl-tin oxide, is sprayed onto the cleaned heated glass base. Immediately thereafter a cobalt oxide containing overcoating is applied by spraying to the tin oxide coated glass substrate. This second coating is applied while the glass substrate remains at the elevated temperature. In all instances the glass substrate is first cleaned and thereafter heated to a temperature in the range of 1,000° to 1,300° F. prior to spraying with the final salt solution. There is a need for a process to coat glass blocks with a metal oxide to form a transparent film on the surface of the glass blocks without extensive preparation techniques or without any substantial deviation from the conventional block forming operation.

SUMMARY OF THE INVENTION

In accordance with the hereinafter described invention, there is provided a method of preparing transparent metal oxide coated glass blocks that includes the steps of forming glass block halves from molten glass, coating surfaces of said glass blocks while at an elevated forming temperature with a metal oxide film yielding composition and thereafter annealing the glass blocks.

The process further includes sealing a pair of block halves while at an elevated forming temperature and thereafter spraying at least one exterior surface of said glass block at the elevated forming temperature of between about 900° F. and 1,150° F. and thereafter annealing said coated glass block.

Accordingly, the principal object of this invention is to provide a method for preparing a transparent metal oxide coated glass block in a manner more efficient and economical than heretofore known.

Another object of this invention is to provide a method for making transparent metal oxide coated glass blocks whereby the conventional glass forming procedure is not substantially interrupted.

A still further object of this invention is to provide a method for coating surfaces of a glass block without further heating of the glass blocks.

These and other objects of this invention will be more completely disclosed and described in the following specification, examples and the appended claims.

DESCRIPTION OF THE PREFERRED EMBODIMENTS

The method of forming a metal oxide coated glass block includes introducing a molten mass of glass, such as molten formulated soda-lime glass into a suitable mold having an exterior forming shell and a fixed bottom plate The exterior forming shell has a generally rectangular configuration and is removably positioned on the fixed bottom plate. A plunger is inserted into the mold while the glass is molten to press the molten glass into the shape of a half block having an exterior surface conforming to the forming shell and bottom plate and an inner surface conforming to the shape of the plunger. The half block with the preselected shape has an upwardly extending generally rectangular edge portion. The glass block halves may, for aesthetic and design purposes, have a face portion with an irregular inner surface, an irregular outer surface or a combination of both. The molten mass of glass inserted in the mold is molten and at a temperature above 1,400° F. to permit the formation of the glass block half. After the glass block half has cooled to solidify the molten glass sufficiently for the block half to retain its shape, the plunger and exterior forming shell are removed from the glass block half. The temperature of the glass block half after removal of the plunger and exterior forming shell and partial cooling is about 900° to 1,150° F., preferably about 1,100° F. This temperature range will be hereinafter referred to as the forming temperature. While at this elevated forming temperature two glass block halves are positioned with their rectangular edge portions in overlying abutting relation. The glass block halves are sealed along the edge portions while the block halves are in the forming temperature range of between 900° and 1,150° F. Conventional flame sealing is employed to seal the block half edge portions and form a unitary glass block comprising the pair of block halves.

Immediately after the glass block halves are sealed and form a unitary glass block and before the glass blocks have had an opportunity to cool substantially and are at a temperature in excess of 900° F., preferably at about 1,000° F., at least one surface of the glass block is sprayed with a liquid metal oxide flim yielding composition for approximately seventeen seconds. The liquid inpinges on the surface of the glass block and the heat of the glass block vaporizes the liquid so that a metal oxide remains on the glass surface. Thereafter the glass block is annealed in a conventional manner.

Where desired, rather than coating an exterior surface of the block after sealing, an exterior surface of a block half at the forming temperature of about between 900° F. and 1,150° F. is sprayed with a liquid solution of a metal oxide film yielding composition. The block halves may thereafter be sealed and annealed in a conventional manner. Where desired, an interior surface of the glass block halves may be sprayed with a liquid metal oxide film yielding composition after the plunger and the exterior forming shell are removed therefrom and the block half is at a temperature of between 900° and 1,150°F. The block halves may thereafter be sealed and annealed in a conventional manner.

The preferred metal oxide film yielding or forming compositions comprise the metal acetylacetonates such as cobalt, iron, chromium, magnesium, vanadium, copper and nickel acetylacetonates and metals thereof. The metal acetylacetonates are preferably applied while dissolved in an organic solvent comprising a mixture of a polar organic solvent and a non-polar organic aromatic solvent. Suitable polar organic solvents are the lower alchols such as methanol, ethanol, propanol etc. Suitable non-polar aromatic solvents are benzene, toluene and xylene.

The invention will be further understood by reference to the following specific examples, which are not intended as limitations thereof. In the examples parts are parts by weight unless otherwise indicated.

EXAMPLE I

Sealed glass blocks at a temperature of about 1,100° F. were sprayed with a liquid solution of 44 grams benzene, 44 grams methanol and 12 grams of cobalt acetylacetonate for a period sufficient to cover one of the faces of the glass block using a conventional spray gun. Spraying was terminated when a reflection on the sprayed surface was observed. The liquid solution upon striking the hot surface of the glass block evaporated and a metal oxide coating remained that provided a gray color to the block. The blocks were thereafter annealed in a conventional manner. The coated surface of the block was subjected to abrasive tests and no abrasion of the metal oxide coating was noted. The metal oxide coated surface was subjected to acid and alkali resistance tests and the surface did not evidence any decomposition of the metal oxide coating at PH values between 0.18 to 13.3.

EXAMPLE II

Substantially the same procedure was followed and a surface of a glass block at a temperature of about 1,100° F. was sprayed with a solution comprising 44 grams benzene, 44 grams methanol and 12 grams of iron acetylacetonate. A gold amber oxide film was formed on the surface of the glass block.

According to the provisions of the patent statutes, I have explained the principle, preferred construction and mode of operation of my invention and have described what I now consider to represent its best embodiment.

I claim:

1. A method for making metal oxide coated glass blocks comprising,
    forming glass block halves from a mass of molten glass at a temperature of between 900° and 1,150° F.,
    while maintaining said elevated temperature of between 900° and 1,150° F. securing a pair of glass block halves to each other,
    while still maintaining said elevated temperature of between 900° and 1,150° F. coating at least one surface of certain of said glass block halves with a metal oxide film forming composition including a metal acetylacetonate, and
    thereafter annealing said glass block with at least one surface of said glass block coated with a metal.

2. A method for making metal oxide coated glass blocks as set forth in claim 1 which includes,
    while at a temperature of about 1,100° F. positioning a pair of glass block halves in abutting relation to each other, and
    flame sealing the edge portions of said glass block halves.

3. A method for making metal oxide coated glass blocks as set forth in claim 1 which includes,
    spraying a surface of certain of said glass block halves with a liquid metal oxide film forming composition while said glass block halves are at a temperature of about 1,000° F.

4. A method for making metal oxide coated glass blocks as set forth in claim 2 which includes,
    spraying a portion of the exterior surface of said glass block with a liquid metal oxide film forming composition after flame sealing said block halves.

5. A method for making metal oxide coated glass blocks as set forth in claim 1 which includes,
    spraying an inner surface of certain of said glass block halves with a liquid metal oxide film forming composition.

6. A method for making metal oxide coated glass blocks as set forth in claim 1 in which,
    said metal acetylacetonate is selected from the group consisting of iron, chromium, magnesium, vanadium, cobalt, copper and nickel acetylacetonates and metals thereof.

7. A method for making metal oxide coated glass blocks as set forth in claim 6 in which,
    said metal oxide forming composition comprises a liquid that includes a polar organic solvent and a non-polar organic aromatic solvent.

8. A method for making metal oxide coated glass blocks as set forth in claim 7 in which,
    said polar organic solvent is selected from the group consisting of methanol, ethanol, propanol and mixtures thereof.

9. A method for making metal oxide coated glass blocks as set forth in claim 7 in which,
    said non-polar organic solvent is selected from the group consisting of benzene, toluene, xylene and mixtures thereof.

* * * * *